United States Patent Office 3,427,458
Patented Feb. 11, 1969

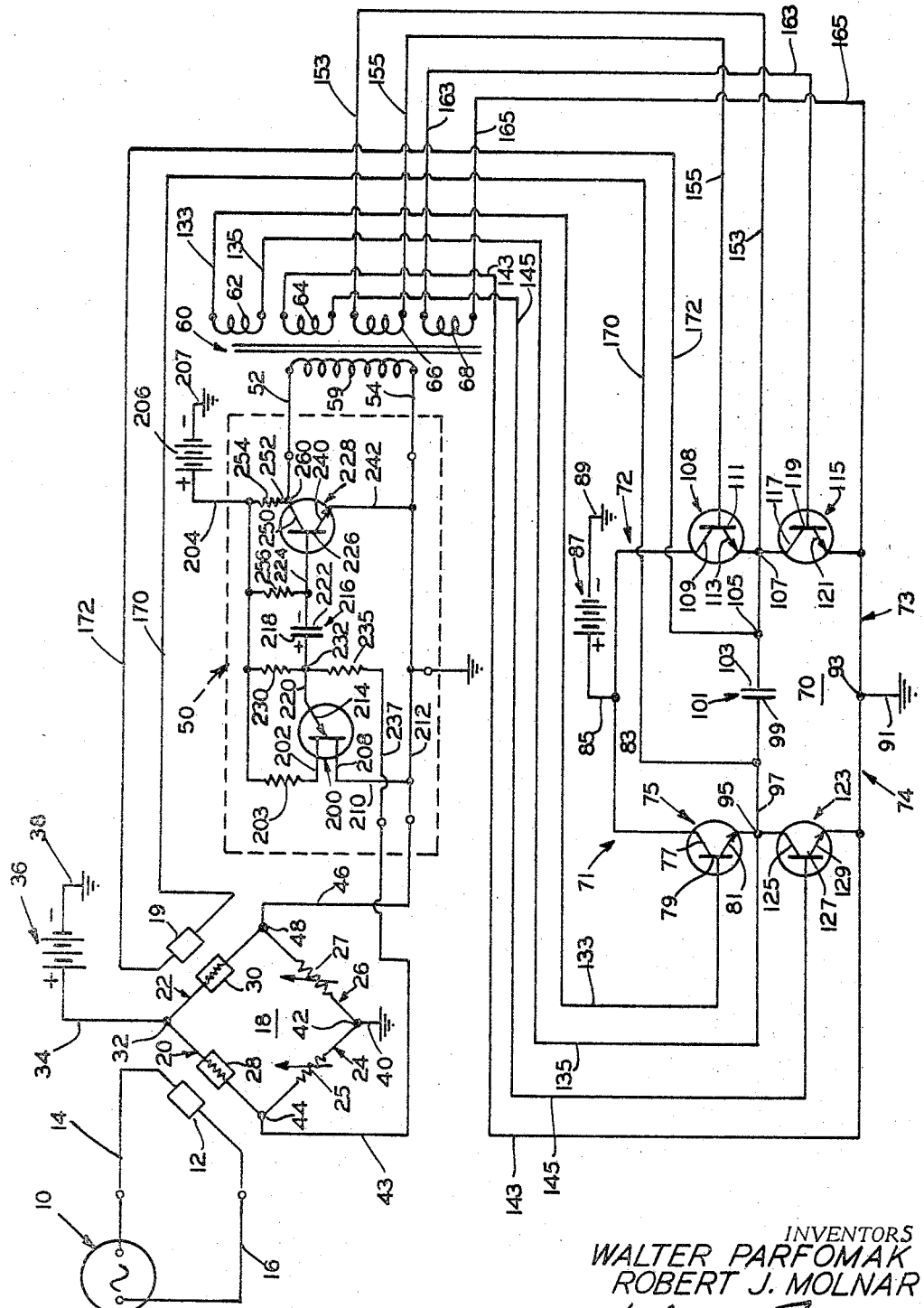

3,427,458
BRIGHTNESS REGULATOR FOR AN ELECTROLUMINESCENT LAMP USING A BRIDGE THE OUTPUT OF WHICH CONTROLS THE FREQUENCY OF A VARIABLE FREQUENCY OSCILLATOR
Walter Parfomak, Wallington, N.J., and Robert J. Molnar, New York, N.Y., assignors to The Bendix Corporation, a corporation of Delaware
Filed Jan. 19, 1966, Ser. No. 521,727
U.S. Cl. 250—205          8 Claims
Int. Cl. G01j 1/32; H01j 39/12

ABSTRACT OF THE DISCLOSURE

A regulation network for regulating the brightness of an electroluminescent lamp whereby as the electroluminescent lamp dims with age it causes a bridge network to become unbalanced. The output voltage of the unbalanced bridge network changes the frequency of the current output of a variable frequency current oscillator. The variable frequency oscillator output is applied through a control circuit and a switching means to the electroluminescent lamp. The change in frequency restores the brightness of the electroluminescent lamp until a null condition in the bridge circuit is achieved which indicates that the electroluminescent lamp has the same brightness as it had prior to aging.

---

This invention relates to a brightness regulation network for an electroluminescent lamp and more particularly to a network for maintaining at a constant value the illumination intensity of a frequency responsive electroluminescent lamp.

An object of the invention is to provide novel means whereby the illumination of a stable reference or standard light source may be compared in a bridge circuit with that of an electroluminescent lamp to be controlled so that an error signal output of the bridge circuit may be in turn fed to a voltage controlled variable frequency oscillator having an output inductively coupled to a power supply control circuit for the electroluminescent lamp, so that the frequency of the output from the oscillator may periodically reverse the polarity of the energizing source applied to the electroluminescent lamp.

Another object of the invention is to provide a brightness regulation network for an electroluminescent lamp in which suitable electrical control elements are arranged in a closed loop so as to maintain constant brightness of an electroluminescent display lamp by varying the frequency of the electrical power supply for the lamp.

Another object of the invention is to provide an improved brightness regulation network for an electroluminescent display lamp operated on a closed loop basis in which the brightness of the display lamp is compared with a stable reference or standard light source, so that upon a decrease in the brightness of the display lamp the regulation network acts to increase the frequency of the energizing current to the lamp until the illumination intensity of the display lamp has been restored to a predetermined value relative to the standard.

Since all electroluminescent lamps will decrease in brightness due to aging and temperature factors, it is important in most aerospace applications to maintain a constant brightness of the lamps for a certain length of time. Therefore, another object of the present invention is to provide a novel electrical control network of simplified design for obtaining a high conversion efficiency in the power supply for the electroluminescent lamps and an automatic regulation of the electrical power supplied to the electroluminescent lamps so as to compensate for aging and temperature effects on the electroluminescent lamps.

These and other objects and features of the invention are pointed out in the following description in terms of the embodiment thereof which is shown in the accompanying drawing. It is to be understood, however, that the drawing is for the purpose of illustration only and is not a definition of the limits of the invention. Reference is to be had to the appended claims for this purpose.

The drawing is a schematic wiring diagram of a brightness regulation network embodying the present invention.

Referring now to the drawing, there is indicated by the numeral 10 a suitable source of electrical energy or alternating current for energizing a stable electroluminescent lamp 12 (pre-aged with 400 c.p.s. excitation) or standard light source which may be connected across the source of electrical energy 10 through the conductors 14 and 16. A bridge circuit indicated generally by the numeral 18 is arranged to compare the brightness or illumination intensity of an electroluminescent display lamp 19 with the stable reference electroluminescent lamp or standard light source 12.

The bridge circuit 18 includes arms designated by the numerals 20, 22, 24, and 26. The arms 24 and 26 include suitable balancing resistor elements 25 and 27, while the arm 20 includes a photoelectric cell 28 and the arm 22 includes a photoelectric cell 30. The photoelectric cells 28 and 30 may be of cadmium sulfide or other suitable substance, the resistance of which is affected by the radiation of light from the lamps 12 and 19, respectively. Photoelectric cell 28 is arranged to sense the radiation of light from the reference electroluminescent lamp or standard light source 12, while the photoelectric cell 30 is arranged to sense the radiation of light from the controlled electroluminescent lamp 19.

Connected to an input point 32 intermediate the arms 20 and 22 of the bridge 18 is a conductor 34 leading to the positive terminal of the source of direct current 26. The negative terminal of the source of direct current 36 is connected by conductor 38 to a common ground. Also leading from the common ground is a conductor 40 which is connected to an opposite input point 42 between the arms 24 and 26.

A conductor 43 leads from an output point 44 intermediate the arms 20 and 24, while a second conductor 46 leads from an opposite output point 48 intermediate the arms 22 and 26 of the bridge 18. The output conductors 43 and 46 lead to the input of a variable frequency oscillator 50 which may be of a suitable type including a voltage responsive means arranged to so control the oscillator 50 as to provide an output current through conductors 52 and 54 of a variable frequency dependent upon the controlling voltage applied through the conductors 43 and 46.

An example of a typical oscillator circuit that may be utilized is illustrated schematically by the oscillator 50 which is of a type in which the frequency of the current applied through output conductors 52 and 54 is proportional to the magnitude of the variable direct current signal voltage applied from the bridge circuit 18 across the input conductors 43 and 46, as hereinafter explained.

The output conductors 52 and 54 leading from the oscillator 50 are connected to a primary winding 59 of a transformer 60 having secondary windings 62, 64, 66, and 68, inductively coupled to the primary winding 59 and connected in parallel to control the output of an electrical power converter circuit 70.

The electrical power converter 70 is in the form of a bridge circuit having arms 71, 72, 73, and 74. In the arm 71 there is provided an NPN type transistor 75 having a collector 77, a base 79, and an emitter 81. The collector 77 is connected to an input point 83 intermediate the arms 71 and 72 and from which there leads a conductor 85 to a positive terminal of a source of direct current on battery 87 having a negative terminal connected by conductor 89 to a common ground. A conductor 91 leads from the common ground to an opposite input point 93 intermediate the arms 73 and 74.

The emitter 81 of the NPN type transistor 75 is connected to an output point 95 intermediate the arms 71 and 74. A conductor 97 leads from the output point 95 to a plate 99 of a capacitor 101. An opposite plate 103 of the capacitor 101 is connected by a conductor 105 to an opposite output point 107 intermediate the arms 72 and 73 of the bridge 70.

Further, there is provided in the arm 72 a second transistor of an NPN type indicated by the numeral 108. The transistor 108 has a collector element 109, a base element 111, and an emitter element 113. The collector 109 is connected to the input point 83 between the arms 71 and 72 and leading through the conductor 85 to the positive terminal of the source of electrical energy or battery 87. The emitter 81 of the transistor 75 is connected to the output point 95 intermediate the arms 71 and 74, while the emitter 113 of the transistor 108 is connected to the opposite output point 107.

Further connected in the arm 73 is an NPN type transistor 115 having a collector 117, a base 119, and an emitter 121. The collector 117 is connected to the output point 107 intermediate the arms 72 and 73, while the emitter 121 is connected to the input point 93 intermediate the arms 73 and 74.

Further connected in the arm 74 is a transistor 123 having a collector 125, a base 127, and an emitter 129. The collector 125 is connected to the output point 95 intermediate the arms 71 and 74, while the emitter 129 of the transistor 123 is connected to the input point 93 intermediate the arms 73 and 74.

The secondary winding 62 of the transformer 60 is connected by electrical conductors 133 and 135 to the base 79 and emitter 81 of the transistor 75 while the parallel secondary winding 64 of the transformer 60 is connected by electrical conductors 143 and 145 to the emitter 129 and base 127, respectively, of the transistor 123. Similarly, the parallel secondary winding 66 of the transformer 60 is connected by electrical conductors 153 and 155 to the emitter 113 and base 111 of the transistor 108; while the parallel secondary winding 68 is connected by electrical conductors 163 and 165 to the base 119 and emitter 121 of the transistor 115.

The bases 79 and 119 of the transistors 75 and 115 are thereby so connected to the parallel secondary windings 62 and 68 of the transformer 60 as to receive pulses of what shall be called positive polarity, when the primary winding 59 is supplied with current; that is, at a time when a current of an increasing intensity flows through the primary winding 59, while the bases 111 and 127 of the transistors 108 and 123 are so connected as to receive pulses of negative polarity during this same time. On the other hand, when the supply of current to the primary winding 59 of transformer 60 is discontinued, that is, at a time when a current of a decreasing intensity is flowing through said primary winding 59, the bases 79 and 119 of the transistors 75 and 115 will receive pulses of a negative polarity, while those bases 111 and 127 of the transistors 108 and 123 will receive pulses of a positive polarity. Thus, the transistors 75 and 115 will be rendered conductive by their control bases having received a positive voltage pulse from transformer 60, while the transistors 108 and 123 will at the same time have been rendered non-conductive by the bases thereof having received negative pulses from the transformer 60.

Conversely, on the control bases 79 and 119 of the NPN type transistors 75 and 115 receiving pulses of negative polarity, the transistors 75 and 115 will be rendered non-conductive, while at the same time the control bases 111 and 127 of the NPN type transistors 108 and 123 will receive positive voltage pulses from the transformer 60 to render the same conductive.

Further, it will be seen that upon the transistors 75 and 115 being rendered conductive and the transistors 108 and 123 being rendered non-conductive, the plate 99 of the capacitor 101 will be positively charged from the battery 87 through the transistor 75 while the opposite plate 103 will have a negative charge applied thereto through the conductive transistor 115 leading to the negative terminal of the battery 87 through the grounded connections 91 and 89. Similarly, upon the transistors 108 and 123 being rendered conductive and the transistors 75 and 115 being rendered non-conductive, the plate 103 will be positively charged from the battery 87 through the transistor 108, while the opposite plate 99 of the capacitor 101 will be negatively charged through the transistor 123 connected to the negative terminal of the battery 87 through the grounded conductors 91 and 89. It will be seen, then, that the voltage applied to the capacitor 101 will alternate in direction depending upon whether the transistors 75–115 and 108–123 are rendered conductive or non-conductive, as heretofore explained.

Conductors 170 and 172 lead from the opposite plates 99 and 103 of the capacitor 102 to effect energization of the electroluminescent display lamp 19. Thus, the bridge circuit 70 including the transistors 75, 108, 115, and 123 provides a highly efficient power drive for the electroluminescent lamp 19. These transistors are driven by the output of the oscillator 50 inductively coupled by the transformer 60 so that when the transistors 75 and 115 are conducting, the transistors 108 and 123 are nonconducting and vice versa. In this manner, the electroluminescent display lamp 19 will be excited by a continuous reversing square wave having an RMS value equal to that of the voltage of the battery 87 and a frequency corresponding to the frequency of the current at the output of the oscillator 50.

Moreover, since the RC time constant across the transistors 75, 108, 115, and 123 is very small, the voltage wave shapes between the collector and emitter elements of the respectvely transistors will have steep rise and fall times; thereby, causing negligible power dissipation in them.

Furthermore, the regulation network operates on a closed loop basis which compares the brightness or illumination intensity of the display lamp 19 with a stable reference electroluminescent lamp or standard light source 12 which, for example, may be preaged with 400 c.p.s. excitation. If the brightness of the display lamp 19 is decreased, then the bridge 18 becomes unbalanced by an increase in the resistance of the photoelectric cell 30 so as to cause the battery 36 to apply a positive D.C. signal at the conductor 43 and a negative D.C. signal at the conductor 46, which are applied to the voltage controlled oscillator 50 so as to increase the frequency of the output current applied by the oscillator 50 through the output lines 52 and 54 and thereby to the primary winding 59 of the transformer 60 in proportion to the magnitude of the direct current signal.

While there are many types of voltage controlled variable frequency oscillators that may be utilized to effect an output current of a frequency proportional to the magnitude of the variable direct current signal, the oscillator 50 is shown as a capacitor controlled type including a unijunction transistor 200 having a base 202 connected through a resistor 203 and a conductor 204 to a positive terminal of a suitable source of a direct current or battery 206 having a negative terminal connected by a conductor 207 to a common ground.

The unijunction transistor 200 has an additional base 208 connected by a conductor 210 to a conductor 212 leading to the common ground. A emitter 214 of the unijunction transistor 200 is effective upon a positive charge being applied thereto in excess of a predetermined value to cause the unijunction transistor 200 to fire.

Applying a biasing voltage to the emitter 214 is a frequency controlling capacitor 216 having a plate 218 connected by a conductor 220 to the control emitter 214 of the unijunction transistor 200, while an opposite plate 222 of the capacitor 216 is connected by a conductor 224 to a base element 226 of an NPN type transistor 228.

A resistor 230 is connected to a point 232 on the conductor 220 and through the conductor 204 to the positive terminal of the battery 206. Further, leading from the point 232 on the conductor 220 is an additional resistor 235 which is in turn connected through a conductor 237 to the output line 43 from the bridge circuit 18. The battery 206 acts to apply a biasing voltage through the resistor 230 to the plate 218 of the capacitor 216 so as to effect, over an interval of time, a positive charge on the plate 218 which upon exceeding a predetermined firing level of the unijunction transistor 200 causes the emitter 214 to fire the unijunction transistor 200.

Simultaneously with the build up in the positive charge applied to the plate 218 of the capacitor 216, the opposite plate 222 is negatively charged through the conductor 224 leading to the base 226 of the NPN type transistor 228 which has an emitter element 240 connected through a conductor 242, to the grounded conductor 212, so as to thereby return a flow of current from the plate 222 to the negative terminal of the battery 206 through the grounded conductor 207.

In addition to the biasing voltage applied by the battery 206 through the resistor 230 to positively charge the plate 218 of the capacitor 216, an additional positive charge may be applied to the plate 218 through the resistor 235 which is connected through conductor 237 to the output line 43 leading from the bridge circuit 18. The opposite output line 46 leads from the bridge circuit 18 to the grounded conductor 212.

The transistor 228 further includes a collector 250 connected by a conductor 252 and a resistor 254 to the conductor 204 leading to the positive terminal of the battery 206. The conductor 204 is further connected through a resistor 256 to the conductor 224 leading to the base 226 of the transistor 228 so that the transistor 228 is positively biased from the source of electrical energy 206, so as to permit a limited flow of current from the collector 250 to the emitter 240 of the transistor 228.

The ouput conductor 52 is connected at a point 260 on the conductor 252 leading from the collector 250 of the transistor 228, while the opposite output conductor 54 is connected to the grounded conductor 212 and thereby to the conductor 242 leading from the emitter 240 of the transistor 228.

It will be seen then that during the charging interval of the capacitor 216, the voltage drop across the transistor 228 will effect a flow of current through the output conductor 52 and primary winding 59 of the transformer 60 and thereby returning to the grounded conductor 54. However, the arrangement is such that upon the positive charge applied to the plate 218 of the capacitor 216 through the resistor element 230 and resistor element 235 exceeding the predetermined firing level of the unijunction transistor 200, there will be effected a flow of current through the resistor 203 and the unijunction transistor 200 from the direct current source 206 which will in effect shunt the transistor 228 so as to cause a rapid decay in the flow of electrical current to the primary winding 59, while simultaneously with the firing of the unijunction transistor 200, the positive charge applied at the plate 218 of the capacitor 216 will discharge through the control emitter 214 and base 208 of the unijunction transistor 200 to the grounded negative conductor 212.

The flow of current through the unijunction transistor 200 effected by the firing thereof will cause the resulting rapid decrease in the flow of current through the primary winding 59 of the transformer 60 to induce an electrical pulse in each of the secondary windings 62, 64, 66, and 68 of the transformer 60 at a frequency proportional to the combined magnitude of the positive direct current signal voltages applied to the plate 218 of the capacitor 216 through the resistors 235 and 230.

The resistor 235 thus serves to apply the positive direct current output signal at the output line 43 from the bridge circuit 18 in additive relation to the positive biasing voltage applied to plate 218 of the capacitor 216 by the battery 206 through the resistor 230, so that the direct current voltages so applied act to control the charging times of the capacitor 216. The charging time of the capacitor 216 may thereby be varied with the magnitude of the direct current signal voltage applied by the bridge circuit 18 so as to in turn effect at the output lines 52 and 54 and through the primary winding 59 of the transformer 60 an output current having a frequency variable in proportion to the magnitude of the controlling direct current signal voltage applied across the lines 43 and 46.

The oscillator network as shown is thus a simple voltage controlled variable frequency oscillator 50 which is basically a unijunction transistor 200 oscillator with an added NPN type transistor 228 serving as an amplifier. The voltage toward which the capacitor 216 charges is controlled by the magnitude of the incoming D.C. voltage on the lines 43 and 46. A low input voltage at the lines 43 and 46 makes the capacitor 216 charge towards a relatively low voltage, and therefore it takes a longer time interval for the capacitor 216 to charge up to the firing level of the unijunction transistor 200. This causes an output current of a corresponding lower frequency to be applied across the primary winding 59 of the transistor 60. Conversely, a higher input voltage at the lines 43 and 46 causes an increase in the output frequency of the current applied across the primary winding 59 of the transformer 60, so as to effect a more rapid charging of the frequency controlling capacitor 216 up to the critical firing level of the unijunction transistor 200.

The output of the oscillator 50 is transformer coupled by the primary winding 59 to the parallel secondary windings 62, 64, 66, and 68 and thereby to the converter bridge 70 so as to increase with a decrease in the brightness of the controlled electroluminescent lamp 19, the frequency of the opening and closing of the control circuits operated by the respective transistors 75, 108, 115, and 123. This action in turn increases the frequency of the reversal of polarity of the excitation current supplied to the electroluminescent display lamp 19, causing the illumination intensity of the display lamp 19 to increase until the brightness thereof has been restored to the original value determined by the stable reference lamp or standard light source 12.

There is thus provided a novel brightness regulation network for an electroluminescent lamp operating in conjunction with a high efficiency power supply in which a feature of the invention lies in the simplified design of the network for obtaining a high conversion efficiency in the power supply and an automatic regulation that compensates for aging and temperature effects upon the electroluminescent display lamp 19. Since such electroluminescent display lamps will decrease in brightness due to aging and temperature factors, it is important in an aerospace application thereof to maintain a constant brightness for a certain length of time by means of a regulator. Such a regulator is provided by the electroluminescent brightness regulation network shown by the drawing, as heretofore explained.

Another feature of the invention resides in the novel combination of elements in which the control elements are arranged in a closed loop so operable as to maintain a constant brightness or illumination intensity of the electroluminescent display lamp 19 by varying the frequency of an electrical power supply for exciting the electroluminescent lamp.

A further feature of the invention resides in the novel over-all design of the network embodying the invention to effect a brightness regulation network with minimum size, weight, and electrical power consumption with increased reliability in operation.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. An electrical control network comprising a control circuit, said control circuit including a photoelectric element, a controlled electroluminescent element, said photoelectric element being so arranged as to receive light radiations from the controlled electroluminescent element, a variable frequency current oscillator including voltage responsive control means for varying the frequency of a current output from the oscillator in direct relation to a controlling voltage, a voltage supply source being connected across an input of the control circuit, said voltage responsive control means being connected across an output voltage of said control circuit and so arranged as to cause said oscillator to increase the frequency of the current output of said oscillator upon an increase in the output voltage of the control circuit effected by a decrease in the light radiations received by said photoelectric element from the controlled electroluminescent element, means responsive to the frequency of the current output of said oscillator for effecting energization of the controlled electroluminescent element so as to regulate the light radiations received by the photoelectric element from the controlled electroluminescent element to a predetermined standard intensity, the means for effecting energization of the controlled electroluminescent element including first and second switching means alternately operable in response to output current from said oscillator for passing a continuous reversing square wave-form current to said electroluminescent element at a frequency controlled by the frequency of the output current from said oscillator.

2. The combination defined by claim 1 in which the voltage responsive control means of the variable frequency current oscillator includes a timing capacitor, means connecting the timing capacitor across the output voltage of the control circuit to render the capacitor responsive to the voltage applied across the output of the control circuit, an electronic valve means to control the frequency of the current output from the oscillator, said electronic valve means being operative by said timing capacitor to increase the frequency of the current output of said variable frequency current oscillator upon an increase in the voltage applied across the output of the control circuit upon a decrease in the light radiations received by said photoelectric element from the controlled electroluminescent element, and the means for effecting energization of the controlled electroluminescent element includes another capacitor for operatively coupling the first and second switching means to the electroluminescent element.

3. The combination defined by claim 1 in which the voltage responsive control means of the variable frequency current oscillator includes a timing capacitor, means connecting the timing capacitor across the output voltage of the control circuit to render the capacitor responsive to the voltage applied across the output of the control circuit, an electronic valve means to control the frequency of the current output from the oscillator, said electronic valve means being operative by said timing capacitor to increase the frequency of the current output of said variable frequency current oscillator upon an increase in the voltage applied across the output of the control circuit upon a decrease in the light radiations received by said photoelectric element from the controlled electroluminescent element, and the means for effecting energization of the controlled electroluminescent element includes another capacitor operatively controlled by the first and second switching means for passing a square wave-form current to said elemtroluminescent element at a frequency controlled by the frequency of the output current from said oscillator.

4. An electrical control network comprising a control circuit, said control circuit including a photoelectric element, a controlled electroluminescent element, said photoelectric element being so arranged as to receive light radiations from the controlled electroluminescent element, a variable frequency current oscillator including voltage responsive control means for varying the frequency of a current output from the oscillator in direct relation to a controlling voltage, a voltage supply source being connected across an input of the control circuit, said voltage responsive control means being connected across an output voltage of said control circuit and so arranged as to cause said oscillator to increase the frequency of the current output of said oscillator upon an increase in the output voltage of the control circuit effected by a decrease in the light radiations received by said photoelectric element from the controlled electroluminescent element, and means responsive to the frequency of the current output of said oscillator for effecting energization of the controlled electroluminescent element including a bridge circuit, a source of direct current connected across a pair of input terminals of the bridge circuit, a capacitor connected across a pair of output terminals of the bridge circuit, conductors connecting the electroluminescent element across the capacitor, said bridge circuit having four arms; including first, second, third, and fourth transistors, one of said transistors being operably connected in each of the arms for controlling the conductivity thereof, each of the transistors having a collector element, an emitter element, and a base element, the collector elements of the first and second transistors being connected to one of the pair of input terminals of the bridge circuit, the emitter elements of the third and fourth transistors being connected to the other of the input terminals of the bridge circuit, the emitter element of the first transistor and the collector element of the fourth transistor being connected to one of the pair of output terminals of the bridge circuit, the emitter element of the second transistor and the collector element of the third transistor being connected to the other of the pair of output terminals, first parallel inductive means for operably controlling the base elements of a first pair of the transistors including the first and third transistors in response to the output current from the oscillator for operation of the first and third transistors, second parallel inductive means for operably controlling the base elements of a second pair of the transistors including the second and fourth transistors in response to the output current from the oscillator for operation of the second and fourth transistors, said first and second parallel inductive means being operable in one sense so as to cause the base elements controlled by said first parallel inductive means to act to render the first pair of transistors conductive between the collector and emitter elements thereof while the base elements controlled by said second parallel inductive means act to render the second pair of transistors non-conductive between the collector and emitter elements thereof, and said first and second parallel inductive means being operable in another alternate sense so as to cause the base elements controlled by said first parallel inductive means to act to render the first pair of transistors non-conductive between the collector and emitter elements thereof while the base elements controlled by said second parallel inductive means act to render the second pair of transistors conductive between the collector and emitter elements thereof, and the first and second pairs of transistors being thereby rendered alternately conductive for passing a continuous reversing square waveform current to said electroluminescent element at a frequency controlled by the frequency of the output current from said oscillator so as to regulate the light radiations received by the photoelectric element of the controlled electroluminescent element to a predetermined standard intensity.

5. An electrical control network comprising a control circuit, said control circuit including a photoelectric element, a controlled electroluminescent element, said photoelectric element being so arranged as to receive light radiations from the controlled electroluminescent element, a variable frequency oscillator including voltage responsive control means for varying the frequency of a current output from the oscillator in direct relation to a controlling voltage, said voltage responsive control means including a timing capacitor, a unijunction transistor including an emitter to control the conductivity of the unijunction transistor, said emitter being controlled by the timing capacitor, a charging circuit means connecting the timing capacitor across the output voltage of the control circuit so as to effect a charging of the capacitor to a predetermined voltage during a time interval to render the unijunction transistor periodically conductive at a frequency variable with the magnitude of the voltage applied across the output of the control circuit, means operative by said unijunction transistor to control the frequency of the current output from the oscillator, said unijunction transistor being operative by said timing capacitor to increase the frequency of the current output of said variable frequency current oscillator upon an increase in the voltage output of the control circuit upon a decrease in the light radiations received by said photoelectric element from the controlled electroluminescent element; a voltage supply source being connected across an input of the control circuit, said voltage responsive control means being connected across an output voltage of said control circuit and so arranged as to cause said oscillator to increase the frequency of the current output of said oscillator upon an increase in the output voltage of the control circuit effected by a decrease in the light radiations received by said photoelectric element from the controlled electroluminescent element, and means responsive to the frequency of the current output of said oscillator for effecting energization of the control electroluminescent element, and the means for effecting energization of the controlled electroluminescent element including a bridge circuit, a source of direct current connected across a pair of input terminals of the bridge circuit, a capacitor connected across a pair of output terminals of the bridge circuit, conductors connecting the electroluminescent element across the capacitor, said bridge circuit having four arms; including first, second, third, and fourth transistors, one of said transistors being operably connected in each of the arms for controlling the conductivity thereof, each of the transistors having a collector element, an emitter element, and a base element, the collector elements of the first and second transistors being connected to one of the pair of input terminals of the bridge circuit, the emitter elements of the third and fourth transistors being connected to the other of the input terminals of the bridge circuit, the emitter element of the first transistor and the collector element of the fourth transistor being connected to one of the pair of output terminals of the bridge circuit, the emitter element of the second transistor and the collector element of the third transistor being connected to the other of the pair of output terminals, first parallel inductive means for operably controlling the base elements of a first pair of the transistors including the first and third transistors in response to the output current from the oscillator for operation of the first and third transistors, second parallel inductive means for operably controlling the base elements of a second pair of the transistors including the second and fourth transistors in response to the output current from the oscillator for operation of the second and fourth transistors, said first and second parallel inductive means being operable in one sense so as to cause the base elements controlled by said first parallel inductive means to act to render the first pair of transistors conductive between the collector and emitter elements thereof while the base elements controlled by said second parallel inductive means act to render the second pair of transistors non-conductive between the collector and emitter elements thereof, and said first and second parallel inductive means being operable in another alternate sense so as to cause the base elements controlled by said first parallel inductive means to act to render the first pair of transistors non-conductive between the collector and emitter elements thereof while the base elements controlled by said second parallel inductive means act to render the second pair of transistors conductive between the collector and emitter elements thereof, and the first and second pairs of transistors being thereby rendered alternately conductive for passing a continuous reversing square wave-form current to said electroluminescent element at a frequency controlled by the frequency of the output current from said oscillator so as to regulate the light radiations received by the photoelectric element from the controlled electroluminescent element to a predetermined standard intensity.

6. The combination defined by claim 1 in which the means for effecting energization of the controlled electroluminescent element includes parallel inductive means for operably connecting the output current from said oscillator to the first and second switching means to alternately render the first and second switching means effective for passing a square wave-form current to said electroluminescent element at a frequency controlled by the frequency of the output current from said oscillator.

7. The combination defined by claim 1 in which the voltage responsive control means of the variable frequency current oscillator includes a timing capacitor, means connecting the timing capacitor across the output voltage of the control circuit to render the capacitor responsive to the voltage applied across the output of the control circuit, an electronic valve means to control the frequency of the current output from the oscillator, said electronic valve means being operative by said timing capacitor to increase the frequency of the current output of said variable frequency current oscillator upon an increase in the voltage applied across the output of the control circuit upon a decrease in the light radiations received by said photoelectric element from the controlled electroluminescent element, and the first and second switching means being alternately operable in response to output current from said oscillator for passing a continuous reversing square wave-form current to said electroluminescent element at a frequency controlled by the frequency of the output current from said oscillator.

8. The combination defined by claim 1 in which the voltage responsive control means of the variable frequency current oscillator includes a timing capacitor, means connecting the timing capacitor across the output voltage of the control circuit to render the capacitor responsive to the voltage applied across the output of the control circuit, an electronic valve means to control the frequency of the current output from the oscillator, said electronic valve means being operative by said timing capacitor to increase the frequency of the current output of said variable frequency current oscillator upon an increase in the voltage applied across the output of the control circuit upon a decrease in the light radiations received by said photoelectric element from the controlled electroluminescent element, and parallel inductive means for operably connecting the output current from said oscillator to the first and second switching means to alternately render the first and second switching means effective for passing a square wave-form current to said electroluminescent element at a frequency controlled by the frequency of the output current from said oscillator.

References Cited

UNITED STATES PATENTS

| | | | |
|---|---|---|---|
| 1,810,172 | 6/1931 | Hayes | 200—205 |
| 2,968,770 | 1/1961 | Sylvan | 333—111 |
| 2,972,694 | 2/1961 | Thornton | 313—108 |
| 3,098,200 | 7/1963 | Jensen | 331—113 |

RALPH G. NILSON, *Primary Examiner.*

M. ABRAMSON, *Assistant Examiner.*

U.S. Cl. X.R.

250—210, 204; 331—113